Dec. 14, 1965  L. O. DOWNES  3,223,774
ELECTRICAL FIXTURE MOUNTING SYSTEM WITH
A DOUBLE FLANGE FRAMING MEMBER
Filed Oct. 1, 1962  2 Sheets-Sheet 1
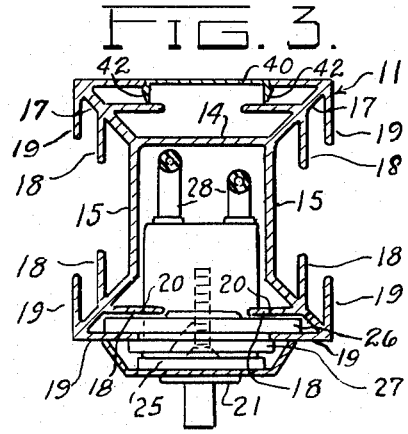
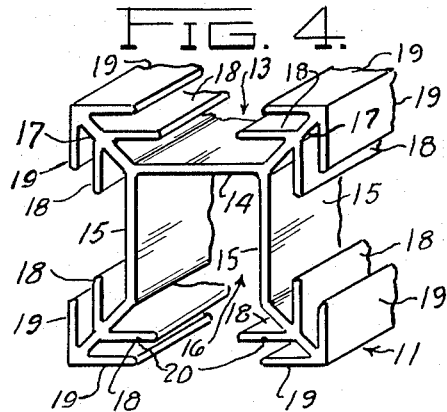
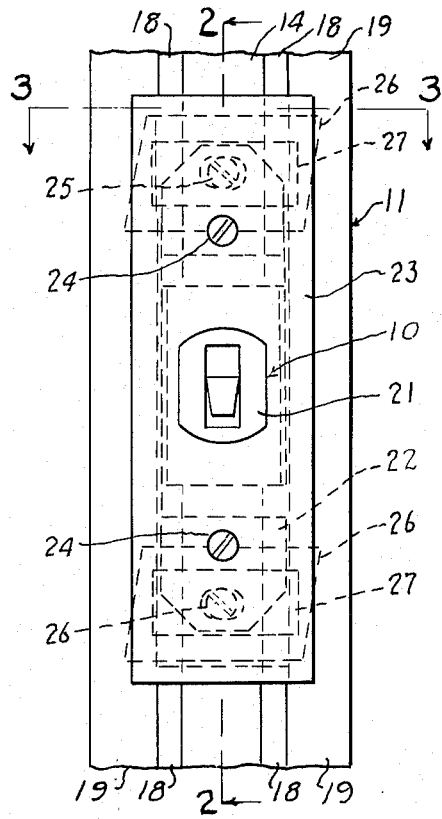
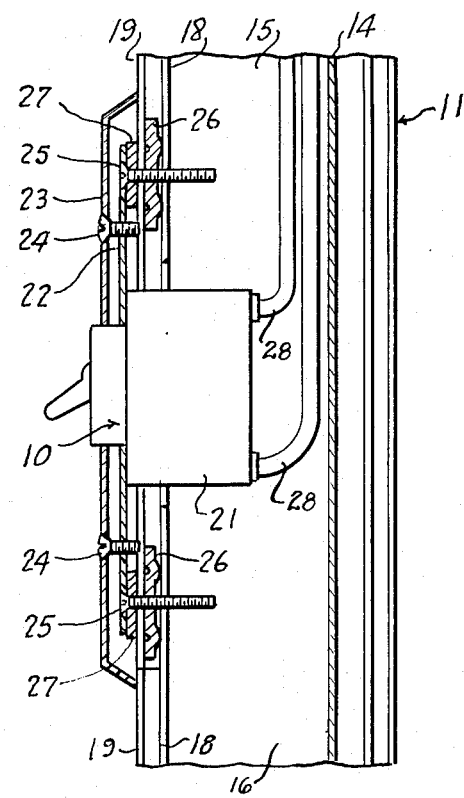
INVENTOR.
Leonard O. Downes
BY
ATTORNEYS

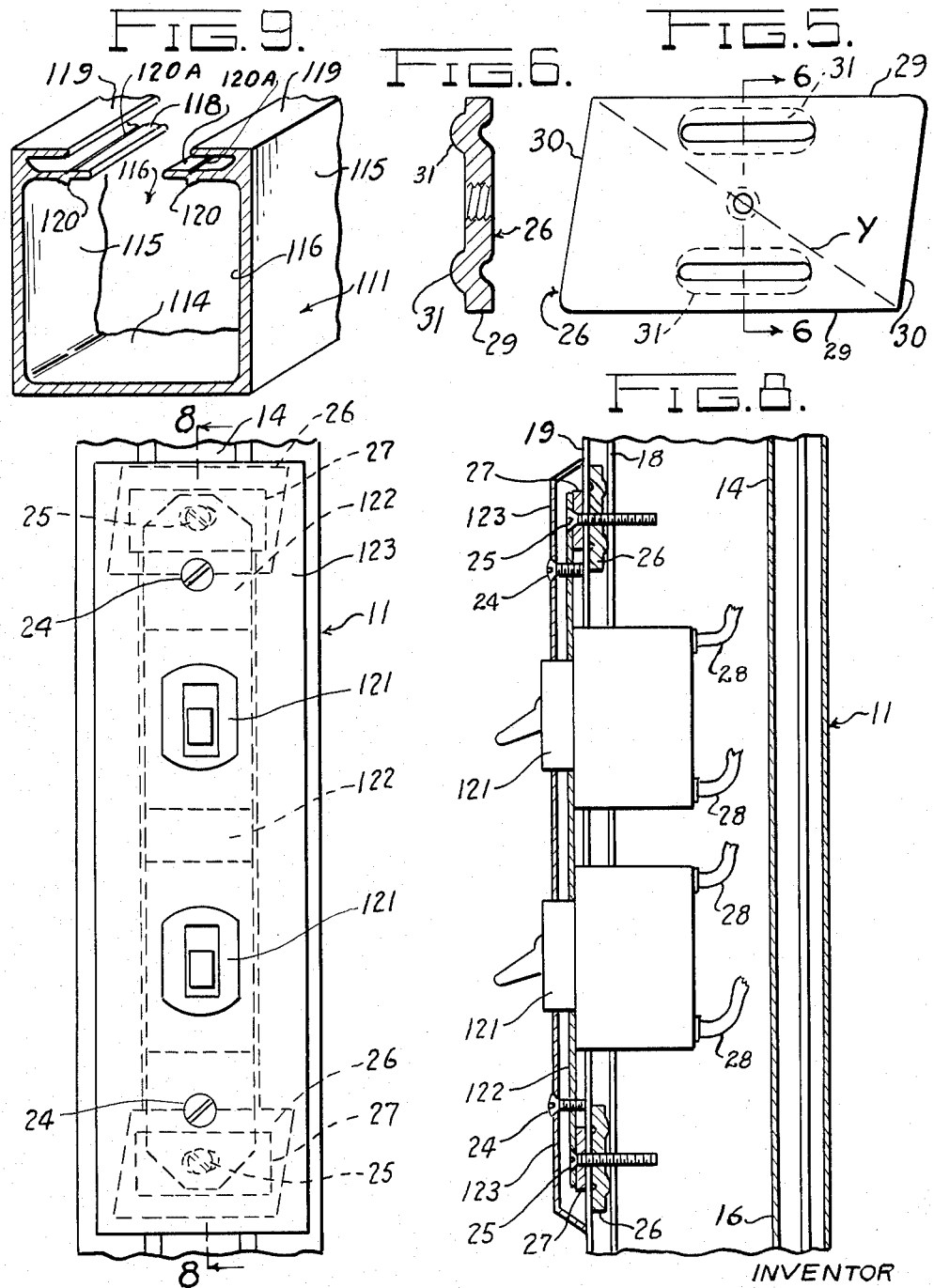

United States Patent Office 3,223,774
Patented Dec. 14, 1965

3,223,774
ELECTRICAL FIXTURE MOUNTING SYSTEM WITH A DOUBLE FLANGE FRAMING MEMBER
Leonard O. Downes, 4077 2nd St., Wayne, Mich.
Filed Oct. 1, 1962, Ser. No. 227,370
7 Claims. (Cl. 174—61)

The present invention relates to electrical fixture mounting systems and more particularly to such a system adapted for use with new partition and framing systems which have been described in copending applications.

My copending application Ser. No. 201,032, filed June 8, 1962, for example, discloses certain unique framing members and my copending application Ser. No. 201,021, filed June 8, 1962, discloses a framing system utilizing these members. My copending applications Serial Nos. 201,019 and 201,024, both filed June 8, 1962, disclose partition systems adapted for use with the aforementioned framing system. The electrical fixture mounting system of the present invention is designed for use with these and other compatible systems.

Certain advantages of these systems have been described in the aforementioned applications and these include capability of architecturally versatile partitioning systems, with concealed connecting elements, being readily assembled and disassembled with a minimum of tools and by relatively unskilled workmen. The present mounting system has been designed with these advantages in view.

It is an object of the present invention to provide an improved electrical fixture mounting system compatible with various partitioning systems by providing mounting means which may be readily assembled and disassembled with a minimum of tools and by relatively unskilled workmen.

Another object of the present invention is to increase the versatility of framing and partition systems by providing an electrical fixture mounting system which permits the electrical fixture to be readily mounted in many different locations.

Yet another object of the present invention is to reduce building costs by providing an electrical fixture mounting system which utilizes existing partition framing members as conduit for the necessary electrical conductors.

Still further objects and advantages of the present invention will be readily apparent to one skilled in the art to which the invention pertains upon reference to the following drawings in which like characters refer to like parts throughout the several views and in which FIG. 1 is a fragmentary elevational view illustrating one preferred embodiment of the present invention.

FIG. 2 is a cross sectional view taken substantially on line 2—2 of FIG. 1.

FIG. 3 is a cross sectional view taken substantially on line 3—3 of FIG. 1.

FIG. 4 is a fragmentary perspective end view of a preferred framing member used in the embodiments herein illustrated.

FIG. 5 is an elevational view of a nut element used in the mounting systems of the present invention.

FIG. 6 is a cross sectional view taken substantially on line 6—6 of FIG. 5.

FIG. 7 is a fragmentary elevational view of another preferred embodiment of the present invention.

FIG. 8 is a cross sectional view taken substantially on line 8—8 of FIG. 7, and

FIG. 9 is a fragmentary perspective end view of another preferred framing member which may be used in the mounting systems of the present invention.

Now referring to the drawings for a more detailed description of the present invention, FIGS. 1–3 illustrate a preferred mounting system as comprising an electrical fixture 10 carried by a framing member 11. As illustrated the electrical fixture 10 is a light switch assembly but it will be apparent that outlet plugs and other electrical fixtures may be mounted in the manner herein disclosed and the present invention is not intended to be limited to the mounting of light switch assemblies.

The particular framing member 11 illustrated in FIGS. 1–3 is shown in perspective in FIG. 4 as comprising a C-shaped portion 13 having a longitudinally extending medial web 14 with legs 15. The web 14 and the legs 15 define a longitudinal central recess 16. The end of each leg 15 is angled outwardly and outwardly angled extrusions sections 17 of similar form are provided at the conjunction of the web 14 and the legs 15. The ends of the legs 15 and the sections 17 each have a pair of spaced parallel flanges 18 and 19 extending from each side toward and in common planes with similar flanges 18 and 19 provided on the adjacent leg 15 and section 17. The edges of the innermost flanges 18 are more closely spaced than the edges of the outermost flanges 18. Longitudinal breaking grooves 20 are provided on the innermost flanges 18 so that portions of the flanges 18 may be readily broken off to equalize the spacing between flanges 18 and 19 respectively.

Although a particular framing member 11 has been described, it will be apparent that other framing members may be used for the mounting system of the present invention. Other suitable framing members are described in my copending application No. 201,032 and one of these is illustrated in FIG. 9 of the present application.

A framing member 111 which may be used in place of framing member 11 is illustrated in FIG. 9 as being substantially U-shaped in cross section and as comprising a longitudinal medial web 114 integrally connecting a pair of substantially parallel legs 115. The end of each leg 115 is provided with a pair of spaced substantially parallel flanges 118–119 extending from each side and in common planes with similar flanges 118–119 provided on the other leg 115. The edges of the innermost flanges 118 are closer together than the outermost flanges 119. Longitudinal ribs 120 are disposed on the inner sides of the flanges 118 and breaking grooves 120A are provided so that the spacing between flanges may be equalized. The web 114 and the legs 115 define a longitudinal central recess 116.

Now referring again to FIGS. 1–3, the electrical fixture 10 is preferably of conventional construction and dimensions and screws 25 od the mounting strap 22 are engaged with a nut element 25 disposed intermediate the flanges 18–19 of the framing member 11. Because the standard mounting strap 22 is usually narrower than the distance between the edges of the outer flanges 19, spacers 27 are provided between the mounting strap 22 and the flange 19 is spanning the space and engaged with the outer surfaces of the flanges 19. The cover plate 23 is then secured to the strap 22 by the screws 24.

Electrical wires 28 are connected with the fixture 10 and are carried in the recess 16.

The nut element 26 is more clearly shown in FIGS. 5–6 as being provided with parallel side edges 29 which are longer than the space between the outer flange 19 but which are laterally spaced a distance less than this space and with parallel inclined end edges 30 such that the greater diagonal Y is longer than the space provided between the sides of that recess portion disposed inwardly of the outer flanges 19. The nut elements 26 are provided with parallel strengthening ribs 31 as shown. The nut elements 26 are inserted under the outer flanges 19 and when turned will engage the sides of the recess 16 so that they will be held in place as the screws 25 are turned.

FIGS. 7–8 illustrate another preferred embodiment of the present invention in which a mounting strap 122 carries a pair of longitudinally spaced switch units 121. A cover plate 123 is secured to the strap 122 by screws 24 and the mounting strap 122 is secured to the framing member 11 by spacers 27, screws 25 and nut elements 26 substantially as described above.

It is apparent from the foregoing description that an electrical fixture mounting system has been disclosed which permits electrical fixtures such as switches and outlet plugs to be readily mounted by relatively unskilled workmen with a minimum of tools. Further the recess 16 of the framing member 11 not only provides the space for carrying the fixture 10 but also is the channel which carries the electrical wires 28 hidden from view. A batten strip 40 shown in FIG. 3 can be provided to cover the recess 16 after the electrical fixture has been installed. The batten strip 40 is provided with longitudinally extending leg portions 42 which resiliently engage the flanges 19. The recess 16 and the flanges 18–19 provide a means by which other framing members 11 can be secured to the member 11 carrying the electrical wires. Further, the fittings and nut elements 26 will not interfere with the wires carried in the recess 16.

It is further apparent that by providing the shorter sides of the nut elements 26 of a length somewhat longer than the space between the inner flanges 18 facility of installation of the electrical fixtures will be substantially increased since the outer surface of the inner flange 18 will provide a surface against which the nut elements 26 can be pressed while the screws 25 are being started. The breaking groove 20 permits the distance between the flanges 18 to be increased so that the nut elements 26 can be installed beneath the flanges 18 if this is desired.

It is also apparent that although I have described but two embodiments of the present invention other changes and modifications may be made without departing from the spirit of the invention or the scope of the appended claims.

What is claimed is:
1. In combination
  (a) a framing member having a longitudinal central recess,
  (b) each side of said recess having a pair of spaced parallel flanges extending toward and in a common plane with the pair of flanges on the other side of said recess,
  (c) an electrical fixture carried in said recess and means securing said fixture to said flanges of said framing member,
  (d) electricity conducting means carried in said recess and electrically connected with said fixture,
  (e) said securing means comprising
    a mounting strap carrying said fixture,
    a screw member carried by said mounting strap,
    a nut member dimensioned to pass between the outermost of said flanges and upon rotation to be secured intermediate said outermost flanges and the innermost pair of said flanges,
    said screw member being received by said nut member and operable upon tightening to bring said nut member into engagement with said outermost flanges whereby said mounting strap and said electrical fixture are secured to said flanges.

2. The combination as defined in claim 1 and including a cover plate overlying said mounting strap, and means securing said cover plate to said mounting strap.

3. The combination as defined in claim 2 and including a batten strip resiliently engaging said flanges and closing said recess adjacent said cover plate.

4. In combination
  (a) an elongated framing member being substantially C-shaped in cross section and having a pair of substantially parallel leg portions and a longitudinal web portion integrally connected with said leg portions,
  (b) an elongated central recess being defined by said web portion and said leg portions,
  (c) each of said leg portions being provided with a pair of spaced parallel flanges extending toward and in a common plane with the flanges on the other of said leg portions,
  (d) an electrical fixture carried in said recess and means securing said fixture to said flanges of said framing member,
  (e) electricity conducting means carried in said recess and electrically connected with said fixture,
  (f) said securing means comprising
    a mounting strap carrying said fixture,
    a screw member carried by said mounting strap,
    a nut member dimensioned to pass between the outermost of said flanges and upon rotation to engage said leg portions beneath said flanges to be secured intermediate said outermost flanges and the innermost pair of said flanges,
    said screw member being received by said nut member and being operable upon being tightened to bring said nut member into engagement with said outermost flanges whereby said mounting strap and said electrical fixture are secured to said flanges.

5. The combination as defined in claim 4 and including a cover plate overlying said mounting strap and means securing said cover plate to said mounting strap.

6. The combination as defined in claim 5 and including a batten strip resiliently engaging said flanges and closing said recess adjacent said cover plate.

7. In combination
  (a) a framing member having a longitudinal central recess,
  (b) each side of said recess having a pair of spaced parallel flanges extending toward and in a common plane with the flanges on the other side of said recess,
  (c) an electrical fixture carried in said recess and means securing said fixture to said flanges of said framing member,
  (d) electricity conducting means carried in said recess and electrically connected with said fixture,
  (e) said securing means comprising means carried by said fixture and dimensioned to straddle said flanges,
    a nut member dimensioned to pass between the outermost pair of said flanges and upon rotation to straddle said outermost flanges in a position intermediate said outermost flanges and the innermost of said flanges,
    a screw member carried by said flange straddling means and received by said nut member and operable upon tightening of said screw member to bring said nut member and said straddling means into tight engagement with said flanges.

References Cited by the Examiner

UNITED STATES PATENTS 1,817,034   8/1931   Hotchkin   174—72

FOREIGN PATENTS 1,205,903   1/1960   France.
544,727   4/1942   Great Britain.

JOHN F. BURNS, *Primary Examiner.*

JOHN P. WILDMAN, *Examiner.*